United States Patent Office.

HENRY PEMBERTON, OF ALLEGHENY, PENNSYLVANIA.

Letters Patent No. 64,250, dated April 30, 1867.

---

IMPROVEMENT IN THE MANUFACTURE OF SOAP.

---

The Schedule referred to in these Letters Patent and making part of the same.

---

TO ALL WHOM IT MAY CONCERN:

Be it known that I, HENRY PEMBERTON, of the city of Allegheny, in the county of Allegheny, and State of Pennsylvania, have invented a new and useful Improvement in the Manufacture of Soap; and I do hereby declare the following to be a full, clear, and exact description thereof.

My invention consists in the preparation of soap by the use of the combination with grease of the neutral fluoride of calcium and alkali; the two latter ingredients being obtained from cryolite, (the fluoride of sodium and aluminium,) treated with lime in the manner hereinafter described. The mineral called cryolite, found only in Greenland, is a natural combination of soda, alumina, and fluoric acid.

To enable others skilled in the art to use my invention, I will proceed to describe the process which I employ for making soap from cryolite.

This mineral is first crushed in a mill, and then ground to fine powder, and sifted through fine bolting-cloth or wire gauze. If the cryolite contains, as is sometimes the case, no other admixture of foreign substances than the carbonates or other salts of the oxides of iron, and earthy matter or other substance not injurious to the properties or color of soap, it is sufficiently pure to need no further preparation previous to mixing it with the other ingredients used for making soap; but if, as frequently occurs, there are present the sulphurets of iron, copper, or lead, or other chemical combinations, which would injuriously affect the soap under the influence of the alkaline solution resulting from the decomposition of the cryolite, then the powdered cryolite should be first gently calcined, with access of air, either with or without the addition of an oxidizing agent, so as to convert the above-named sulphurets of the metals, by oxidation, into the sulphates of the oxides of the same metals, in which latter state they have no injurious effect on the soap, whereas in their former condition of sulphurets they would give it a black or dirty color. The pure or purified cryolite thus prepared is now added, in small quantities at a time, to a preparation of boiling milk of lime, containing about seventy-five parts of lime, (measured before slaking,) to one hundred parts of pure cryolite; the relative proportions of these ingredients being varied in the inverse ratio of their purity. The water used in preparing the milk of lime should be in sufficient quantity to slake the lime into a thin milk, and the sand, lime, or other impurities in the lime, should be allowed to settle in the slaking vessel, so as to be retained therein when the milk of lime is decanted into the boiling kettle in which the cryolite is mixed therewith. About half a gallon of water is sufficient to every pound of cryolite employed. While the cryolite is being added to the milk of lime, and afterwards until the decomposition of the cryolite is complete, which requires about two hours, the mixture is kept boiling, and is constantly stirred. The result of the decomposition of the cryolite thus effected is a solution of aluminate of soda, and of hydrate of soda, mixed with the insoluble fluoride of calcium. By boiling and evaporation the solution should now have a density of 30° Baumé, which may be ascertained by filtering a small portion for the purpose, and if the solution proves to be weaker than 30°, the boiling should be continued until the proper density is attained, and if stronger, water is added until the required degree is obtained. The heat should now be removed, and the melted fat or grease, free from dirt or impurities, is added in the proportion of about three pounds and three quarters of fat to every pound of cryolite present in the mixture. The fat must be thoroughly mingled with the alkaline mixture by constant stirring, kept up until the mass becomes of the uniform consistence of honey, and all traces of grease have disappeared. In lieu of a portion of the fat, rosin may be substituted if desired. The process of saponification or union of the fat and alkali, in this process, and with these ingredients, takes place very easily, and with more than ordinary rapidity, being greatly facilitated by the presence of the fluoride of calcium, which, although insoluble, is thoroughly distributed through the mass by stirring, and which causes and maintains that perfect and intimate division of the particles of fat, one from another, upon which the ready saponification of the grease depends. The union of the ingredients being now complete, the mass should be allowed to cool somewhat, and may then be ladled out into frames to harden, and is then cut into bars or cakes, and finished in the usual way.

The process of making soap which I have described possesses some remarkable advantages over that ordinarily employed, in the cheapness, simplicity, and rapidity of operation, in largely increased yield of soap in proportion to the fat employed, and in the superior detergent qualities of the soap thus produced. The relative reduction of cost by this process is due to cheapness of the materials used, and the saving of time required for saponification before alluded to, and in the simplicity of the process, which dispenses with the ordinary and expensive preparation of soda lye from leaching or boiling a mixture of soda ash and lime, and the separation of the resulting caustic soda solution, or the equally troublesome preparation of such lye from cryolite by boiling and separating the liquor. The separation of the liquor from the insoluble carbonate of lime, or fluoride of calcium, as the case may be, is not only expensive in itself, but involves the unavoidable loss of a considerable portion of the soda by the practical impossibility of extracting all the alkali from the large quantity of insoluble magma remaining. The increase of the yield of soap by my process is due to the incorporation with it of the fluoride of calcium resulting from the process of boiling the cryolite in milk of lime. The fineness of division of its particles, its almost gelatinous condition, and its perfect neutrality, render it preferable in every way to clay and other substances usually added to such soap; and as it is otherwise a waste product, its use does not increase the price, while it largely augments the yield; so that from two and one half to three pounds of hard soap, of excellent quality, can in this way be obtained, at a minimum cost of operation, from one pound of grease or fat.

The soap prepared by my process is of superior quality, being uniform in texture and appearance, and it also possesses highly detergent qualities, to which the presence of the alumina of the cryolite largely contributes, while it is also less caustic than soap made from the ordinary caustic alkalies, and therefore less injurious to delicate fabrics or to the human skin.

What I claim as my invention, and desire to secure by Letters Patent, is—

The preparation of soap from cryolite, substantially in the manner hereinbefore described.

In testimony whereof I, the said HENRY PEMBERTON, have hereunto set my hand in presence of us—

H. PEMBERTON.

Witnesses:
   SAML. SIMES,
   T. H. BRACKEN.